Dec. 24, 1935.          J. M. REDINGER          2,025,308
                         ROTARY CUTTER
                       Filed Jan. 3, 1934
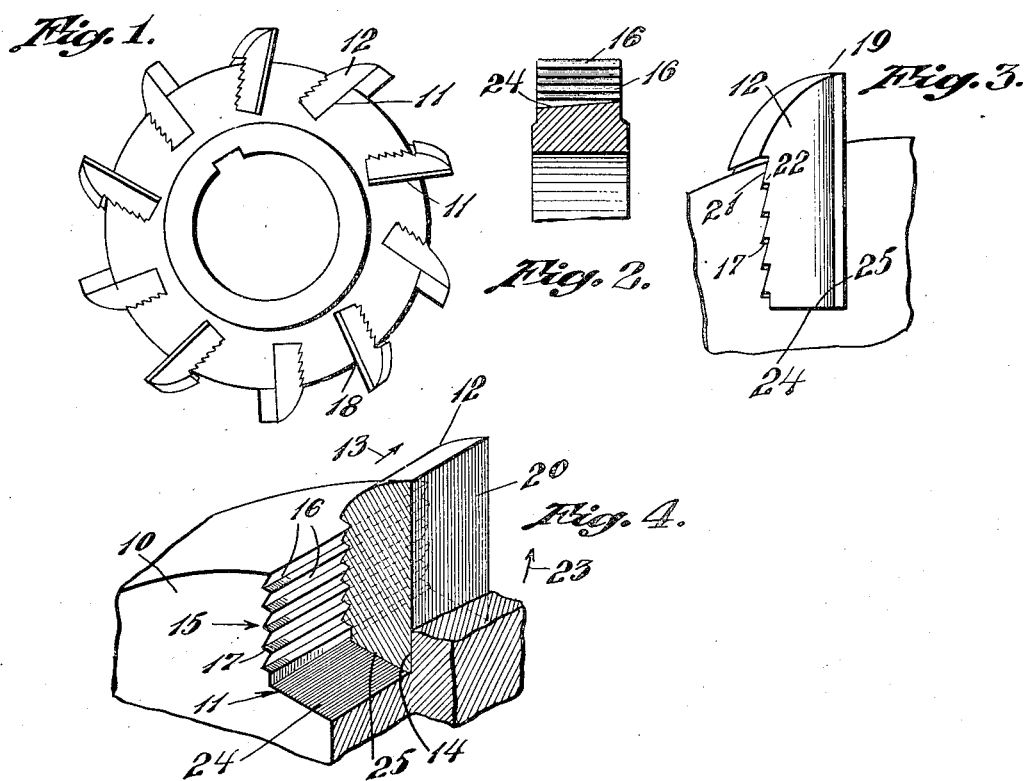
INVENTOR.
Joseph M. Redinger
BY Barlow & Barlow
ATTORNEYS.

Patented Dec. 24, 1935

2,025,308

UNITED STATES PATENT OFFICE 2,025,308

ROTARY CUTTER

Joseph M. Redinger, Providence, R. I.

Application January 3, 1934, Serial No. 705,068

2 Claims. (Cl. 29—105)

This invention relates to a means for detachably securing two members together; and has for one of its objects the provision of an arrangement such that when the parts are secured together they will be as one solid piece for operative purposes.

Another object of the invention is the shaping of the contacting surfaces between the separable parts so that when the parts are forced together they will be held for operating purposes as one solid piece.

Another object of the invention is the provision of tapered surfaces on the members inclined toward different right angular directions such that as the members are moved relatively in one direction they will be forced together into firm engagement.

Another object of the invention is the dividing of the usual long taper into several parts so that the two detachable members will be less clumsy in their interfitting or interlocking relation.

Another object of the invention is the forming of spaced engaging surfaces instead of a single long engaging surface whereby to facilitate fitting the parts for forming engaging surfaces throughout their range of extent.

With these and other objects in view, the invention consists of certain novel features of construction, as will be more fully described, and particularly pointed out in the appended claims.

In the accompanying drawing:

Fig. 1 is an end view of a different cutter.

Fig. 2 is a sectional view thru the cutter taken thru one of the sockets for receiving a removable tooth.

Fig. 3 is a fragmental view of the cutter, showing a tooth inserted in the body portion of the cutter.

Fig. 4 is a perspective view partially in section of a fragmental portion of the cutter showing the body portion of the cutter and the insertable tooth.

In the use of cutters in machine tools, it is necessary to interchange different cutters. In the formation of either side or face milling cutters, it is desirable from several standpoints to make separate insertable teeth in the body of the cutter as the making of the body portion of the cutter and teeth all in one piece frequently results in injury to some of the parts in the processing which they go thru, also in use should one of the teeth break it is a less expensive matter to replace a tooth than to replace the entire cutter. One of the disadvantages in interchangeable teeth and other separable parts is that the connection of the parts such as the teeth with the cutter allows some movement at the joint and the cutter does not operate as effectively as a solid cutter, and in order that I may form a separable part and have these parts secured together so that they will act as effectively as a solid cutter and there be no looseness at the joint, I have provided interfitting tapers which may be forced together in close relation, which tapered surfaces will engage at several spaced points along one surface and with a taper at right angles to it for lifting the tooth against this tapered surface whereby I am enabled to secure the tooth in its position as firmly as if the tooth were a solid part of the cutter. And the following is a more detailed description of the present embodiment of this invention whereby these advantageous results may be obtained:—

In the drawing, I have illustrated the application of this invention for the inserting of a tooth in a side or facing milling cutter where the movement of the insertable part is in a more or less relative rectilinear direction.

With reference to the drawing, 10 designates the body portion of a facing milling machine cutter, in which there are located recesses 11 along the edge thereof. These recesses are arranged alternately at opposite angles to present the edges of the insertable teeth 12 at opposite angular directions to their path of movement with reference to the work on which they are to operate.

In Fig. 4 which is slightly distorted for the purposes of illustration, the tooth 12 is moved into the recess 11 by movement in the direction of the arrow 13.

One wall 14 of this recess 11 is straight, the opposite wall designated generally 15 is formed with a plurality of tapered surfaces 16, each in a plane parallel to the other and spaced therefrom and each extending in width a short distance and then connected to the next tapered surface by an edge portion 17. The taper of each of the abutment surfaces 16 is such that any movement along it towards the outer portion of the body 10 will approach the wall 14.

The tooth 12 is formed with one of its surfaces 20 straight to engage the wall 14 of the recess 11, while the opposite edge of the tooth 12 is formed with a plurality of tapered surfaces 21 of the same taper or inclination as the surfaces 16, the extent of these surfaces 21 being substantially the same as the surfaces 16 and offset from each other in parallel planes which are spaced from each other the same distance as the surface 16 and are connected by an edge portion 22 at substantially right angles to the wall 14 and each having all the points thereof lying at the same radial distance from the axis of the cutter, the arrangement of the staggered incline or tapered surfaces 21 and 16 of the body 19 and tooth 12 are such that the tooth may be slid into the recess 12 parallel to a plane passing thru the axis of the cutter from the side of the body of the cutter but cannot be pulled out in the direction of the arrow 23 by reason of the tapered surfaces 21 and 16 engaging to prevent such movement.

In order that the tooth 12 may be bound tightly in engagement in the recess in which it is positioned, some means is provided for moving the tooth 20 in the direction of the arrow 23, in order that there will be a binding engagement between the tapered surfaces 16 and 21. This means I have shown as the bottom wall 24 of the recess 11 inclined to the direction of sliding of the tooth or cutting element so that when the bottom 25 of the tooth 20, which is also preferably similarly inclined, slides along the wall 24 it will be moved outwardly in the direction of the arrow 23 so that the abutment surfaces 21 and 16 of the tapers will be tightly bound together and the tooth will be prevented from moving when in the cutter by reason of the rigid support by which it will engage at the spaced points along the surfaces 16 and 21.

The angles of the tapers 16 and 21 may be varied throughout some range. However, I have chosen fifteen degrees as a suitable angle which the surfaces 16 and 21 will bear to the wall 14 or surface 20. The angle of the wall 24 and surface 25 may also be varied throughout the substantial range. However, I have chosen five degrees as a taper which will cause the movement of the tapered abutment surfaces 16 and 21 into position as desired. It is to be understood that this angle of five degrees is an angle between the surface 24 and the edge between the surface 16 and the portion 17 which connects the surfaces 16 in their staggered arrangement.

Of course, it is understood the lesser the angle the easier it is mechanically to tighten up the separable parts such as inserting the tooth in the body portion of the cutter, while the steeper the angle the quicker such tightening may be accomplished altho greater force must be applied. I, however, have chosen an angle of five degrees which is such an angle as will remain firmly in tightened position after set up. If using the edge 18 of the tooth as well as the edge 19, I will insert the tooth from the direction of the edge 18 so that any tendency to force the tooth inwardly will force it into tighter engagement.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A rotary cutter comprising a body having an outwardly opening recess with spaced walls and a bottom wall, a cutting element in said recess, a complemental series of interfitting serrations on one of said side walls and said element, said serrations presenting engaging surfaces inclined toward the opposite wall of the recess and extending across said wall at the same radial distance from the rotary axis of the body to preserve the radial position of said element as said element is moved into position, said bottom wall and the bottom of said element being inclined with reference to said rotary axis, whereby movement of said element in said recess with said bottom surfaces in contact will move said engaging surfaces into firm relationship.

2. A rotary cutter comprising a body having an outwardly opening recess with spaced side walls, and a bottom wall, a cutting element in said recess, a complemental series of interfitting serrations on one of said side walls and said element, said serrations presenting engaging surfaces extending across said wall at the same radial distance from the rotary axis of the body to preserve the radial position of said element as said element is moved into position, said engaging surfaces being inclined on a relatively long taper toward the opposite side wall of the recess and connected with one another by abrupt surfaces extending at substantially right angles to the said opposite side wall, said bottom wall and the bottom of said element being inclined with reference to said rotary axis, whereby movement of said element in said recess with said bottom surfaces in contact will move said engaging surfaces into firm relationship.

JOSEPH M. REDINGER.